United States Patent
Glynn et al.

(10) Patent No.: US 8,890,892 B2
(45) Date of Patent: Nov. 18, 2014

(54) SYSTEM AND METHOD FOR STEGANOGRAPHIC IMAGE DISPLAY

(75) Inventors: Dominic Glynn, Berkeley, CA (US); Anthony A. Apodaca, San Rafael, CA (US); Rod Bogart, San Rafael, CA (US); David W. Crawford, Long Beach, CA (US); Ed Nemeth, Hermosa Beach, CA (US)

(73) Assignee: Pixar, Emeryville, CA (US)

( * ) Notice: Subject to any disclaimer, the term of this patent is extended or adjusted under 35 U.S.C. 154(b) by 1133 days.

(21) Appl. No.: 12/617,602

(22) Filed: Nov. 12, 2009

(65) Prior Publication Data
US 2011/0122152 A1    May 26, 2011

Related U.S. Application Data

(63) Continuation-in-part of application No. 12/386,896, filed on Apr. 24, 2009.

(51) Int. Cl.
*G09G 5/36* (2006.01)
*G06F 21/84* (2013.01)

(52) U.S. Cl.
CPC .......... *G06F 21/84* (2013.01); *G09G 2358/00* (2013.01); *G09G 38/001* (2013.01)
USPC .......................................... 345/629; 348/239

(58) Field of Classification Search
CPC ................................................. G01C 21/32
USPC ........................................ 345/629; 348/239
See application file for complete search history.

(56) References Cited

U.S. PATENT DOCUMENTS

| | | | |
|---|---|---|---|
| 4,879,603 A | 11/1989 | Berman | |
| 5,537,476 A | 7/1996 | Coteus | |
| 5,613,004 A * | 3/1997 | Cooperman et al. | ............ 380/28 |
| 5,614,920 A | 3/1997 | Coteus | |
| 5,619,219 A | 4/1997 | Coteus | |
| 5,629,984 A | 5/1997 | Mcmanis | |
| 5,748,763 A * | 5/1998 | Rhoads | ............ 382/115 |
| 5,821,989 A | 10/1998 | Lazzaro et al. | |
| 5,963,371 A * | 10/1999 | Needham et al. | ............ 359/464 |

(Continued)

FOREIGN PATENT DOCUMENTS

| WO | 99-40476 B | 8/1999 |
|---|---|---|
| WO | 2004110773 A1 | 12/2004 |

OTHER PUBLICATIONS

Hou, Young-Chang. "Visual cryptography for color images," Dept. of Information Management, National Central University, Jung Li, Taiwan 320, ROC, Pattern Recognition 36 (2003), pp. 1619-1629.

(Continued)

*Primary Examiner* — Javid A Amini
(74) *Attorney, Agent, or Firm* — Patterson & Sheridan, LLP

(57) ABSTRACT

A computer-implemented method for generating images. The method includes receiving first and second target images. The method further includes computing a delta image based on a difference between the first target image and the second target image and a technique for multiplexing a first display image with the delta image, where the first display image multiplexed with the delta image, when viewed by a person in an ambient setting, is perceived as the second target image. Advantageously, a hidden image is obscured from an ambient observer, while still providing the ambient observer with a target image that is intended to be perceived.

37 Claims, 10 Drawing Sheets

(56) References Cited

U.S. PATENT DOCUMENTS

| | | | |
|---|---|---|---|
| 6,021,196 A * | 2/2000 | Sandford et al. | 713/176 |
| 6,044,156 A * | 3/2000 | Honsinger et al. | 380/54 |
| 6,529,209 B1 | 3/2003 | Dunn et al. | |
| 6,557,103 B1 * | 4/2003 | Boncelet et al. | 713/176 |
| 6,650,306 B2 * | 11/2003 | Yerazunis et al. | 345/8 |
| 6,806,930 B2 | 10/2004 | Moia | |
| 7,043,019 B2 * | 5/2006 | Tehranchi et al. | 380/218 |
| 7,046,440 B1 | 5/2006 | Kaehr | |
| 7,164,779 B2 * | 1/2007 | Yerazunis et al. | 382/100 |
| 7,319,755 B2 | 1/2008 | Struyk | |
| 7,609,451 B1 | 10/2009 | Scarbrough | |
| 7,796,753 B2 | 9/2010 | Alasia et al. | |
| RE43,362 E | 5/2012 | Yerazunis et al. | |
| 2003/0028664 A1 * | 2/2003 | Tan et al. | 709/237 |
| 2003/0222901 A1 | 12/2003 | Houck et al. | |
| 2003/0233563 A1 * | 12/2003 | Kruse | 713/193 |
| 2004/0060976 A1 * | 4/2004 | Blazey et al. | 235/375 |
| 2004/0070588 A1 | 4/2004 | Harrington | |
| 2005/0077351 A1 * | 4/2005 | De Jong | 235/380 |
| 2006/0256287 A1 * | 11/2006 | Jacobs | 352/85 |
| 2007/0040780 A1 | 2/2007 | Gass | |
| 2007/0164558 A1 | 7/2007 | Wicker | |
| 2008/0022128 A1 * | 1/2008 | Proudler et al. | 713/189 |
| 2008/0030800 A1 * | 2/2008 | Matsukawa et al. | 358/474 |
| 2008/0056529 A1 * | 3/2008 | Bhattacharjya | 382/100 |
| 2008/0058894 A1 * | 3/2008 | Dewhurst | 607/54 |
| 2010/0079585 A1 | 4/2010 | Nemeth et al. | |
| 2010/0225751 A1 | 9/2010 | Nemeth | |
| 2011/0264922 A1 * | 10/2011 | Beaumont et al. | 713/189 |
| 2012/0069139 A1 | 3/2012 | Basso et al. | |
| 2013/0172048 A1 * | 7/2013 | Rodriguez et al. | 455/556.1 |

OTHER PUBLICATIONS

Wang, et al. "On the Analysis and Generalization of Extended Visual Cryptography Schemes," Department of Computer Science and Technology, Tsinghua University, Beijing, China, 2006.

Naor, et al. "Visual cryptography," Department of Applied Math and Computer Science, Weizmann Institute, Rehovot, Israel, 1995.

Ateniese, et al. "Extended Capabilities for Visual Cryptography," Theoretical Computer Science 250 (2001) pp. 143-161.

Garera, Sujata. "Secret Sharing & Visual Cryptography," Lecture Slides, 650.470—Basics of Applied Cryptography and Network Security, Johns Hopkins University, Fall 2008, presented on Nov. 25, 2008 (available at: http://cs.jhu.edu/~sdoshi/crypto/lecture19.pdf).

Karagosian, Michael, "Digital 3D—in a Theatre Near You?", INS Asia Magazine (Aug. 2005), available at <http://mkpe.com/publications/d-cinema/insasia/3d.php>.

Giuseppe Anteniese et al.,. "Extended capabilities for Visual cryptography," Theoretical Computer Science 250 (2001) 143-161.

DaoShun Wang et al., "On the Analysis and Generalization of Extended Visual Cryptography Schemes," (Submitted on Oct. 31, 2006).

Haibo Zhang et al., "Visual Cryptography for General Access Structure by Multi-Pixel Encoding with Variable Block Size," 2008 International Symposium on Knowledge Acquisition and Modeling, (2008) IEEE.

Office Action, U.S. Appl. No. 12/386,896 dated May 18, 2012.

Final Office Action, U.S. Appl. No. 12/386,896 dated Nov. 2, 2012.

Office Action, U.S. Appl. No. 12/386,896 dated Nov. 8, 2013.

\* cited by examiner $$462 \left\{ \quad A - H \implies \Delta \right.$$

$$464 \left\{ \quad H \xrightarrow{\text{split}} \alpha + \beta \right.$$

$$466 \left\{ \quad \alpha + \beta + \Delta \implies A \right.$$

$$468 \left\{ \quad (\alpha + \beta + \Delta) - \Delta \implies \alpha + \beta \implies H \right.$$

510 { A − H1 − H2 => Δ

512 { H1 + H2 + Δ => A

514 { (H1 + H2 + Δ) − H2 − Δ => H1

516 { (H1 + H2 + Δ) − H1 − Δ => H2

SYSTEM AND METHOD FOR STEGANOGRAPHIC IMAGE DISPLAY

CROSS-REFERENCE TO RELATED APPLICATIONS

This application is a continuation-in-part of U.S. patent application Ser. No. 12/386,896, filed Apr. 24, 2009, which is hereby incorporated herein by reference.

BACKGROUND

1. Field of the Invention

The present invention relates to the field of computer graphics and, in particular, to a system and method for steganographic image display.

2. Description of the Related Art

Steganography is the science of obscuring a desired message or image from a casual observer so that, through the use of the correct key, an observer can un-obscure the desired message or image. One typical example of using steganography to obscure an image involves cereal box hidden message decoders. A cereal box may include a piece of colored plastic that, when placed over an obscured image printed on the cereal box, reveals the hidden image. The image that is printed on the cereal box is typically a muddled image that does not portray a desired or valuable image. For example, the image that is printed on the cereal box may be a "noise field" that is meant to hide the hidden image.

One problem with conventional steganographic techniques for obscuring hidden images is that often the observer can detect that a hidden image is being concealed. In some steganographic techniques, the desired image is visually present in the image that is observed by the observer, but is at least partially obscured. Typically, the observer can often see a "hint" of the image, even by viewing without any particular decoder. This creates a puzzle-breaking psychology, where the observer knows that an image is being hidden and seeks to detect the hidden image without any decoder.

A second problem is that the image viewed by the observer without a decoder is not an interesting image. As described, often the hidden image is obscured by a noise field. The noise field added to the hidden image creates an undesirable and uninteresting image.

As the foregoing illustrates, there is a need in the art for an improved technique for steganographic image display.

SUMMARY

Embodiments of the invention provide a system and method for generating images. A person that views a display image without looking though a specialized filter perceives a first target image that is intended to be perceived. When the person views the display image through a specialized filter, then the person perceives a second target image. Embodiments of the invention are achieved by computing a delta image that is related to the difference between the two non-noise images, and multiplexing the second non-noise image with the delta image.

One embodiment of the invention provides a computer-implemented method for generating images. The method includes receiving first and second target images. The method further includes computing a delta image based on a difference between the first target image and the second target image and a technique for multiplexing a second display image with the delta image, where the second display image multiplexed with the delta image, when viewed by a person in an ambient setting, is perceived as the first target image.

Another embodiment of the invention provides a system including a device configured to cause a first display image multiplexed with a delta image to be displayed, where the second display image multiplexed with the delta image, when viewed by a person in an ambient setting, is perceived as a first target image, where the delta image is based on a difference between the first target image and the second target image and a technique for multiplexing the second display image with the delta image.

Yet another embodiment of the invention provides a computer-implemented method for generating images. The method includes receiving first, second, and third target images. The method further includes computing a delta image based on a difference between the first target image, the second target image, and the third-target image, and a technique for multiplexing the delta image with a second display image and a third display image, where the delta image multiplexed with the second display image and the third display image, when viewed by a person in an ambient setting, is perceived as the first target image.

Advantageously, embodiments of the invention provide a technique for obscuring an image from an ambient observer, while still providing the ambient observer with a target image that is intended to be perceived. Thus, the ambient observer would not be able to detect that an image is being hidden within the displayed image or obscured by the displayed image that the ambient observer perceives.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF EXEMPLARY EMBODIMENTS

Embodiments of the invention provide a system and method for image display. A person that views a display image without looking though a specialized filter perceives a first non-noise target image that is intended to be viewed. When the person views the display image through a specialized filter, then the person perceives a second non-noise target image. Embodiments of the invention are achieved by computing a delta image that is the difference between the two non-noise images, and multiplexing the second non-noise image with the delta image.

Figure 1:
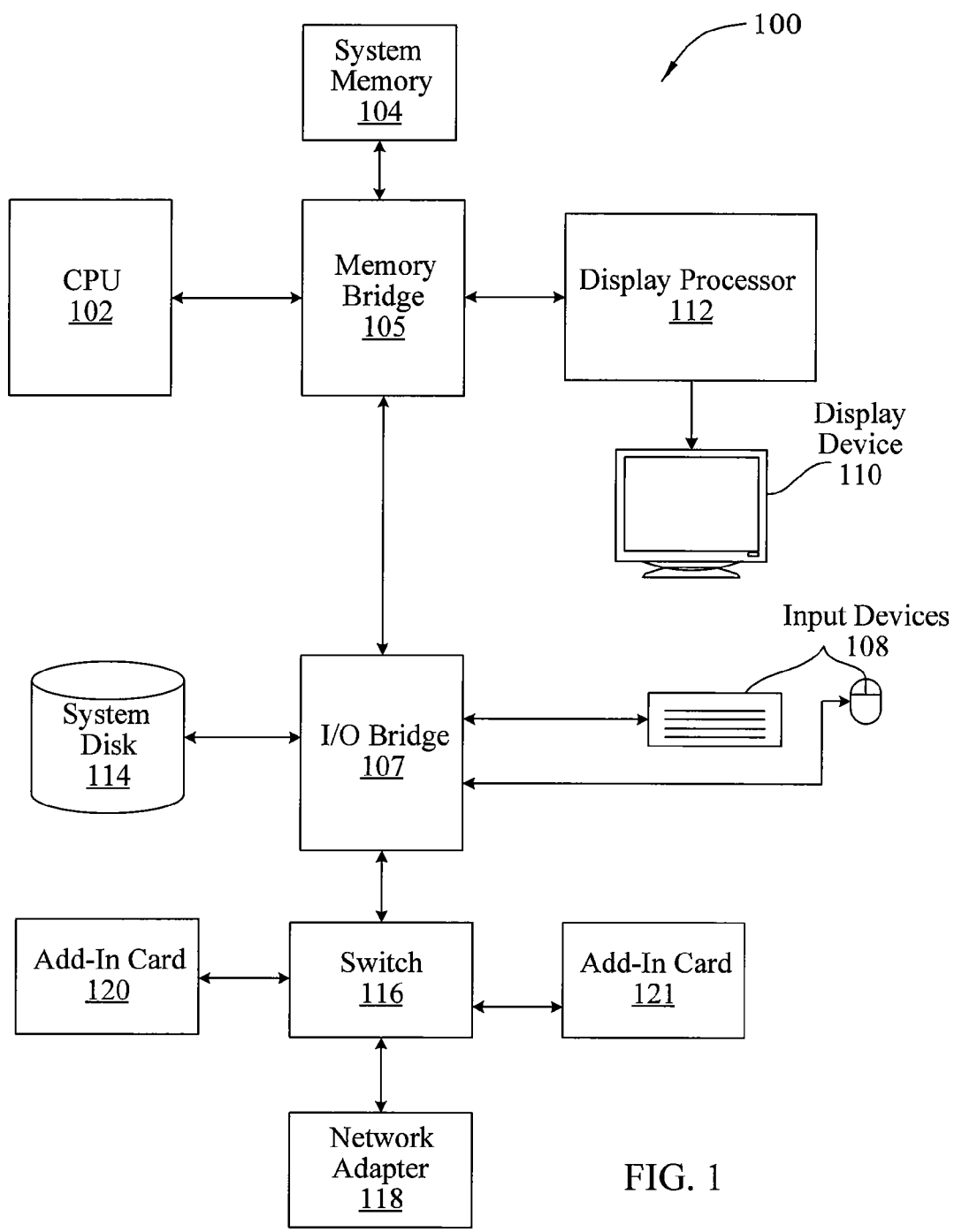
FIG. 1 is a block diagram of a system configured to implement one or more aspects of the present invention.

FIG. 1 is a block diagram of a system 100 configured to implement one or more aspects of the present invention. System 100 may be a digital video playback device, computer workstation, personal computer, video game console, personal digital assistant, rendering engine, or any other device suitable for practicing one or more embodiments of the present invention.

As shown, system 100 includes a central processing unit (CPU) 102 and a system memory 104 communicating via a bus path that may include a memory bridge 105. CPU 102 includes one or more processing cores, and, in operation, CPU 102 is the master processor of system 100, controlling and coordinating operations of other system components. System memory 104 stores software applications and data for use by CPU 102. CPU 102 runs software applications and optionally an operating system. Memory bridge 105 is connected via a bus or other communication path to an I/O (input/output) bridge 107. I/O bridge 107 receives user input from one or more user input devices 108 (e.g., keyboard, mouse, joystick, digitizer tablets, touch pads, touch screens, still or video cameras, motion sensors, and/or microphones) and forwards the input to CPU 102 via memory bridge 105. In some embodiments, input/output devices may include a radio frequency identification (RFID) tag and/or RFID reader. Additionally, any other technically feasible technique for implementing user identification is within the scope of embodiments of the invention.

A display processor 112 is coupled to memory bridge 105 via a bus or other communication path; in one embodiment display processor 112 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 104.

Display processor 112 periodically delivers pixels to a display device 110 (e.g., a screen or conventional CRT, plasma, OLED, SED or LCD based monitor or television). Additionally, display processor 112 may output pixels to film recorders adapted to reproduce computer generated images on photographic film. Display processor 112 can provide display device 110 with an analog or digital signal.

A system disk 114 is also connected to I/O bridge 107 and may be configured to store content and applications and data for use by CPU 102 and display processor 112. System disk 114 provides non-volatile storage for applications and data and may include fixed or removable hard disk drives, flash memory devices, and CD-ROM, DVD-ROM, Blu-ray, HD-DVD, or other magnetic, optical, or solid state storage devices.

A switch 116 provides connections between I/O bridge 107 and other components such as a network adapter 118 and various add-in cards 120 and 121. Network adapter 118 allows system 100 to communicate with other systems via an electronic communications network, and may include wired or wireless communication over local area networks and wide area networks such as the Internet.

Other components (not shown), including USB or other port connections, film recording devices, and the like, may also be connected to I/O bridge 107. For example, an audio processor may be used to generate analog or digital audio output from instructions and/or data provided by CPU 102, system memory 104, or system disk 114. Communication paths interconnecting the various components in FIG. 1 may be implemented using any suitable bus or point-to-point communication protocol(s), and connections between different devices may use different protocols, as is known in the art.

In one embodiment, display processor 112 incorporates circuitry optimized for graphics and video processing, including, for example, video output circuitry, and constitutes a graphics processing unit (GPU). In another embodiment, display processor 112 incorporates circuitry optimized for general purpose processing. In yet another embodiment, display processor 112 may be integrated with one or more other system elements, such as the memory bridge 105, CPU 102, and I/O bridge 107 to form a system on chip (SoC). In still further embodiments, display processor 112 is omitted and software executed by CPU 102 performs the functions of display processor 112.

Pixel data can be provided to display processor 112 directly from CPU 102. In some embodiments of the present invention, instructions and/or data representing a scene are provided to a render farm or a set of server computers, each similar to system 100, via network adapter 118 or system disk 114. The render farm generates one or more rendered images of the scene using the provided instructions and/or data. These rendered images may be stored on computer-readable media in a digital format and optionally returned to system 100 for display. Similarly, stereo image pairs processed by display processor 112 may be output to other systems for display, stored in system disk 114, or stored on computer-readable media in a digital format.

Alternatively, CPU 102 provides display processor 112 with data and/or instructions defining the desired output images, from which display processor 112 generates the pixel data of one or more output images, including characterizing and/or adjusting the offset between stereo image pairs. The data and/or instructions defining the desired output images can be stored in system memory 104 or graphics memory within display processor 112. In an embodiment, display processor 112 includes 3D rendering capabilities for generating pixel data for output images from instructions and data defining the geometry, lighting shading, texturing, motion, and/or camera parameters for a scene. Display processor 112 can further include one or more programmable execution units capable of executing shader programs, tone mapping programs, and the like.

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies display processor 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
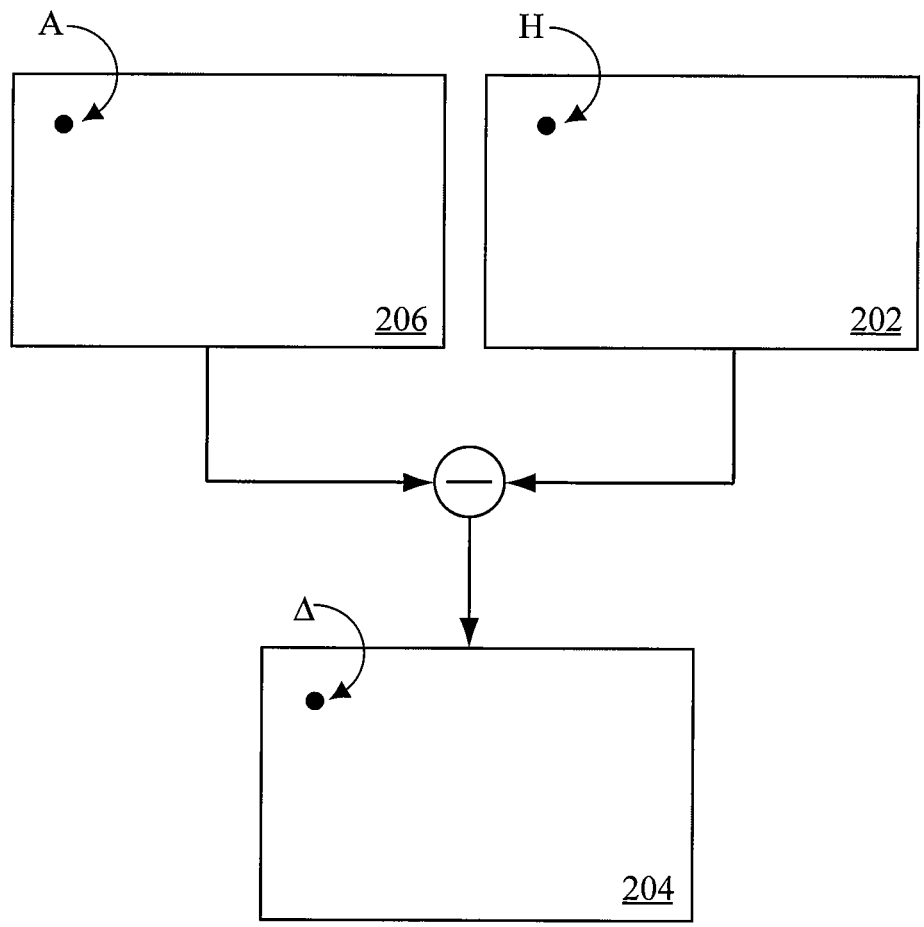
FIG. 2 is a conceptual diagram illustrating two images configured for steganographic image display and creation of a third image, according to one embodiment of the invention.

FIG. 2 is a conceptual diagram illustrating two images 202, 204 configured for steganographic image display and the creation of a third image 206, according to one embodiment of the invention. As shown, image 202, also referred to herein as a "hidden image," is composed of a plurality of image locations, where the color at each of the plurality of image locations is a frequency spectrum referred to as spectrum "H." Image 204, also referred to herein as a "delta image," is composed of a plurality of image locations, where the color at each of the plurality of image locations is a frequency spectrum referred to as spectrum delta "$\Delta$." Image 206, also referred to herein as an "ambient image," is composed of a plurality of image locations, where the color at each of the plurality of image locations is a frequency spectrum referred to as spectrum "A."

In one embodiment, image 202 and image 206 are input images. The image 204 is computed by calculating the difference between the image 202 and the image 206 at each image location, as illustrated in FIG. 2 and equation 208. As described, the spectrum $\Delta$ at a first image location in image 204 is configured so, that when the spectrum $\Delta$ is combined with the corresponding spectrum H at the first image location in image 202, then the combination equals the corresponding spectrum A at the first image location in image 206, as illustrated by equation 210. Similarly, when the spectrum $\Delta$ at the first image location is excluded from the spectrum (H+$\Delta$), then the remaining spectrum equals spectrum H at the first image location, as illustrated by equation 212.

In some embodiments, both image 202 and image 206 are "target images," meaning that both images represent an image that is intended to be perceived. Image 204, in those embodiments, would be a non-target image, since image 204 would provide whatever "offset" spectra are necessary to supply the difference between image 202 and image 206. In one embodiment, image 202 and image 206 portray similar images, but with some minor variations. For example, image 206 may portray a scene with a variety of objects, and image 202 may portray the same scene with an additional "hidden" object present. In alternative embodiments, image 202 and image 206 portray apparently unrelated images that appear very dissimilar. For example, image 206 may portray an outdoor nature scene; whereas, image 202 may portray a stock market trading floor.

In some embodiments, image 206 is viewed by an observer that is not looking through any filter(s). Also, image 202 can be recovered from the image 206 by application of an additional "not($\Delta$)" filter that either blocks spectrum $\Delta$ or selectively passes spectrum H. For example, the image 206 may be projected by a projector onto a theater screen. Viewers that are wearing special glasses that provide the not($\Delta$) filter can see image 202, but will not see image 206; whereas, viewers that are not wearing any type of specially-filtered glasses will see image 206. In this fashion, two different viewers, one wearing a specialized filter and one not wearing any specialized filter, can see two completely different images when looking at the same screen. In some prior art techniques, each viewer wears individual specialized headgear and can see a different image when looking at the same display device. However, in these prior art techniques, an ambient viewer (i.e., a viewer that is not wearing any specialized or filtering headgear) does not see a "target image." Rather, in these prior art techniques, the ambient viewer sees a blank image, or significantly "noisy" image that does not portray a useful or desirable image.

Various techniques can be used to generate image 206 from the combination of images 202 and 204. In one embodiment, two different projectors may be used to generate image 206, where a first projector projects image 202 and a second projector projects image 204 coincidently. As described, in order for a viewer to view the ambient image 206, no specialized filtering mechanism is needed. However, for a viewer to view the hidden image 202, some filter is required.

In another embodiment, images 202 and 204 are time division multiplexed. As is known, when two different images are displayed in fast succession, a human's eyes and brain cannot distinguish between the two images and, instead, perceives an image that is a combination of the two images. For example, if the images 202 and 204 are being provided by a projector that projects images, then at time t=1 the projector may display image 202 and at time t=2 the projector may display image 204. The projector may alternate, at each timestep, between image 202 and image 204. If time division multiplexing is used to combine images 202 and 204, then a time synchronizing device that exposes only one of the images to the viewer can be used to reveal the hidden image. For example, liquid crystal display (LCD) shutter glasses may be configured so that both shutters are transparent at the same time and opaque at the same time. In this manner, each time that image 204 is being displayed, image 204 may be blocked by the LCD shutter glasses, and each time that the hidden image 202 is displayed, the shutters of the LCD shutter glasses would not block the hidden image 202, and hence the hidden image 202 passes to the eyes of the viewer. In another example, some other light-blocking object that can be synchronized in time with the projection of the delta image 204 so that the light-blocking object occludes the delta image 204 may also be used.

In alternative embodiments, rather than using time division multiplexing, other techniques may be used to combine images 202 and 204. In one embodiment, frequency division multiplexing may be used to combine images 202 and 204. Accordingly, an ambient viewer can view the displayed image 206 that contains all frequencies contained in both images 202 and 204; whereas, a viewer that is viewing the displayed image 206 through a filter that does not pass the certain light frequencies contained in image 204 perceives the hidden image 202. In another embodiment, phase division multiplexing may be used to combine images 202 and 204. Accordingly, a viewer that is observing the displayed image 206 through a polarizing filter that passes light of a particular phase or phase range can view image 202. In further embodiments, one or more of a optical polarization, shuttering, depth of field alteration, light intensity alteration, light angle alteration, anaglyph filters, and/or other filtering techniques may be used to combine images 202 and 204.

Additionally, in various alternative embodiments, the filter(s) that block the delta image 204 need not be worn by viewers in order to perceive the hidden image. In one embodiment, an LCD shutter panel is placed in a diorama or stage set, so that the hidden image 202 is visible when the viewer peers through the panel; whereas, the ambient image 206 is visible when the viewer does not peer through the panel. In one embodiment, certain windows in a wall may contain spectral frequency filters so that viewers peering thorough these windows see the hidden image 202, while viewers peering through unfiltered windows see the ambient image 206. In another embodiment, a viewer may examine a scene through a magnifying glass, telescope, or similar apparatus that includes filters that allow the viewer to perceive the hidden image 202. In yet another embodiment, hidden image filters can be combined with the filters used to present 3D stereoscopic image display so that some viewers see hidden stereoscopic content. In still another embodiment of the invention, the images 202 and 204 may be projected onto a wall, such as a wall within a theme park. For example, persons that look at the wall while wearing specialized filtered glasses may perceive image 202, while persons that look at the wall without a specialized filter perceive image 206. In another embodiment, image 202 is painted or otherwise imbedded onto a wall or projection surface, and image 204 is projected onto it. As understood by persons having ordinary skill in the art, various other configurations are also within the scope of embodiments of the invention.

In some embodiments, depending on the precision, tolerance, and/or resolution of the particular filter being used to extract image 204 from image 206 (e.g., time, frequency, phase, etc.) and/or the design of the images 202, 204, the system 200 can be extended such that three or more target images may be perceived by different viewers. Additionally, embodiments of the invention work equally for still images, moving images, and/or printed images.

Additionally, there are additional calibration and/or encoding and/or delivery and/or configuration adjustments that may used to improve the perception of both target images 202, 206. In order to achieve the results described herein, the exclusion process that removes image 204 from image 206 should be exactly (or almost exactly) the inverse of the process that combines images 202 and 204. If these two operators are not well matched, then hints of the hidden image 202 may be visible in the ambient image 206.

In the physical world, there are certain behaviors and imperfections with technology for which compensation may be needed. For example, projection equipment, electronics systems, or viewing filters may alter the visible spectra of either image 202 or image 204, leading to visible artifacts or leaving hints of the hidden image 202 in image 206. For each implementation of embodiments of the invention, a separate analysis may be needed to determine what calibrations are necessary to achieve the desired results. For example, a display system may have a finite set of colors that can be displayed, which is referred to as the gamut of the display. If the spectrum H or the spectrum $\Delta$ does not occur in the gamut of the display device, alternate colors must be carefully chosen which represent the missing colors as closely as possible without revealing the existence of the hidden image. Alternatively, if the multiplexed spectrum H+$\Delta$ does not occur in the gamut of the display device, the device will display a color which is similar to H+$\Delta$ which does not match spectrum A. In this case, alternate colors for H and $\Delta$ must be chosen that are in the display gamut and will match A as closely as possible without revealing the existence of the hidden image. Due to these calibrations and adjustments, the computation of the delta image 204 will include more computation than merely the difference of the colors in image 202 and image 206.

Figure 3A:
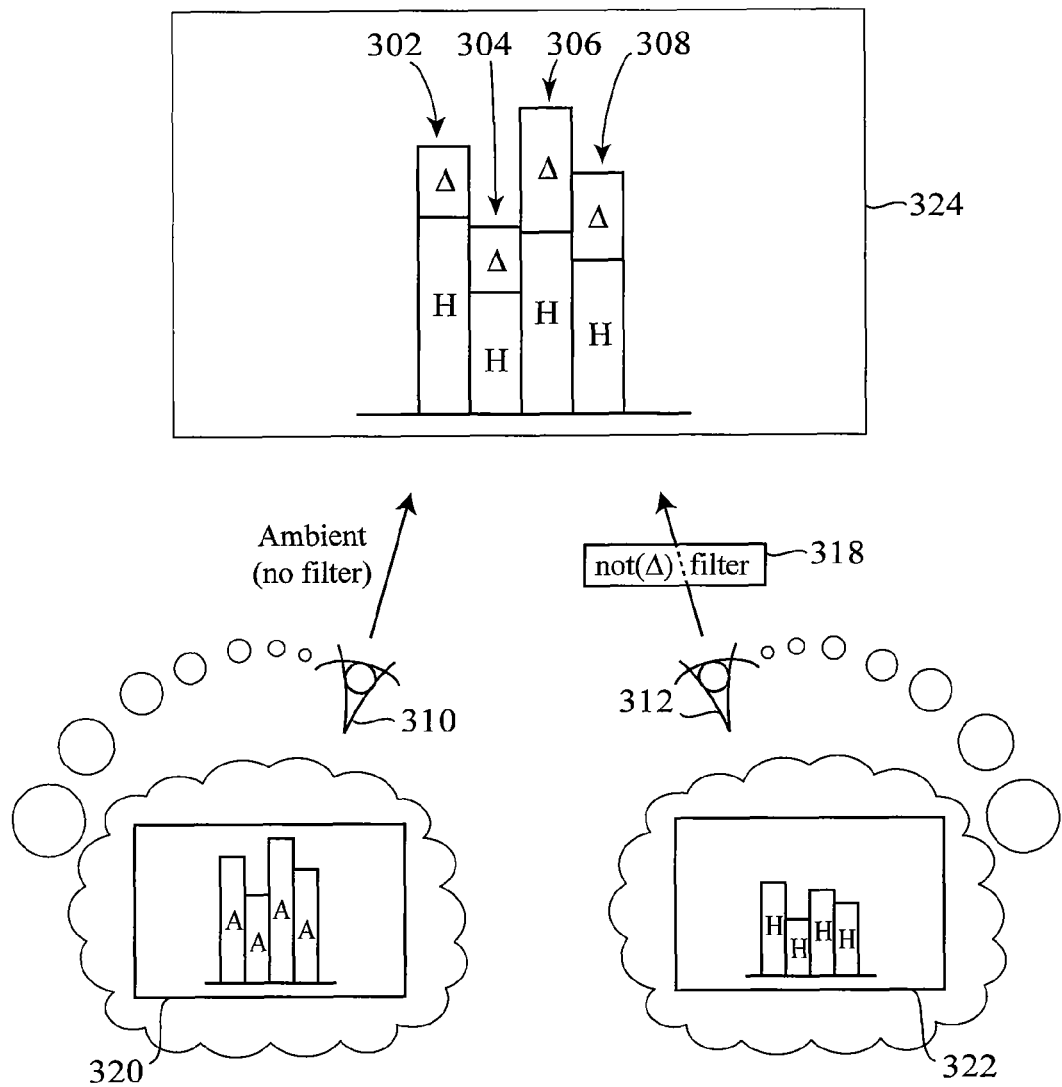
FIG. 3A is a conceptual diagram of a display image viewed by two viewers, according to one embodiment of the invention.

FIG. 3A is a conceptual diagram of a display image 324 viewed by two viewers 310, 312, according to one embodiment of the invention. As shown, the display image 324 includes image locations 302, 304, 306, 308. Each image location may be composed of data from image 202 and image 204, as described in FIG. 2. For example, the data may be spectral data. For each image location, the total spectrum is composed of a first portion that is associated with image 202 (spectrum H) and a second portion that is associated with image 204 (spectrum $\Delta$). The viewer 310 may be viewing the display image 324 in an ambient setting with no filter. In contrast, the viewer 312 may be viewing the display image 324 through a filter 318. The filter 318 may be configured as a "not($\Delta$)" filter that does not pass frequencies from image 204, e.g., does not pass frequencies from spectrum $\Delta$.

The viewer 310, when viewing the display image 324, perceives view 320. Each image location in view 320 has a spectrum that is the combination of the spectra from image 202 (spectrum H) and image 204 (spectrum $\Delta$). As described in FIG. 2, the combination of these spectra results in spectrum A. In contrast, viewer 312, when viewing the display image 324 through the filter 318, perceives view 322. Each image location in view 322 has a spectrum that is the combination of the spectra from image 202 and image 204 (spectrum H+$\Delta$=A) less the spectrum from image 204 (spectrum $\Delta$). In other words, viewer 312 perceives spectrum (H+$\Delta$)–$\Delta$=H. As described in FIG. 2, the result of these operations is image 322 (spectrum H). As also described above, each of images 322 and the display image 324 are "target" images, where both images are desirable when perceived. In contrast, image 204 may be a non-target image.

Figure 3B:
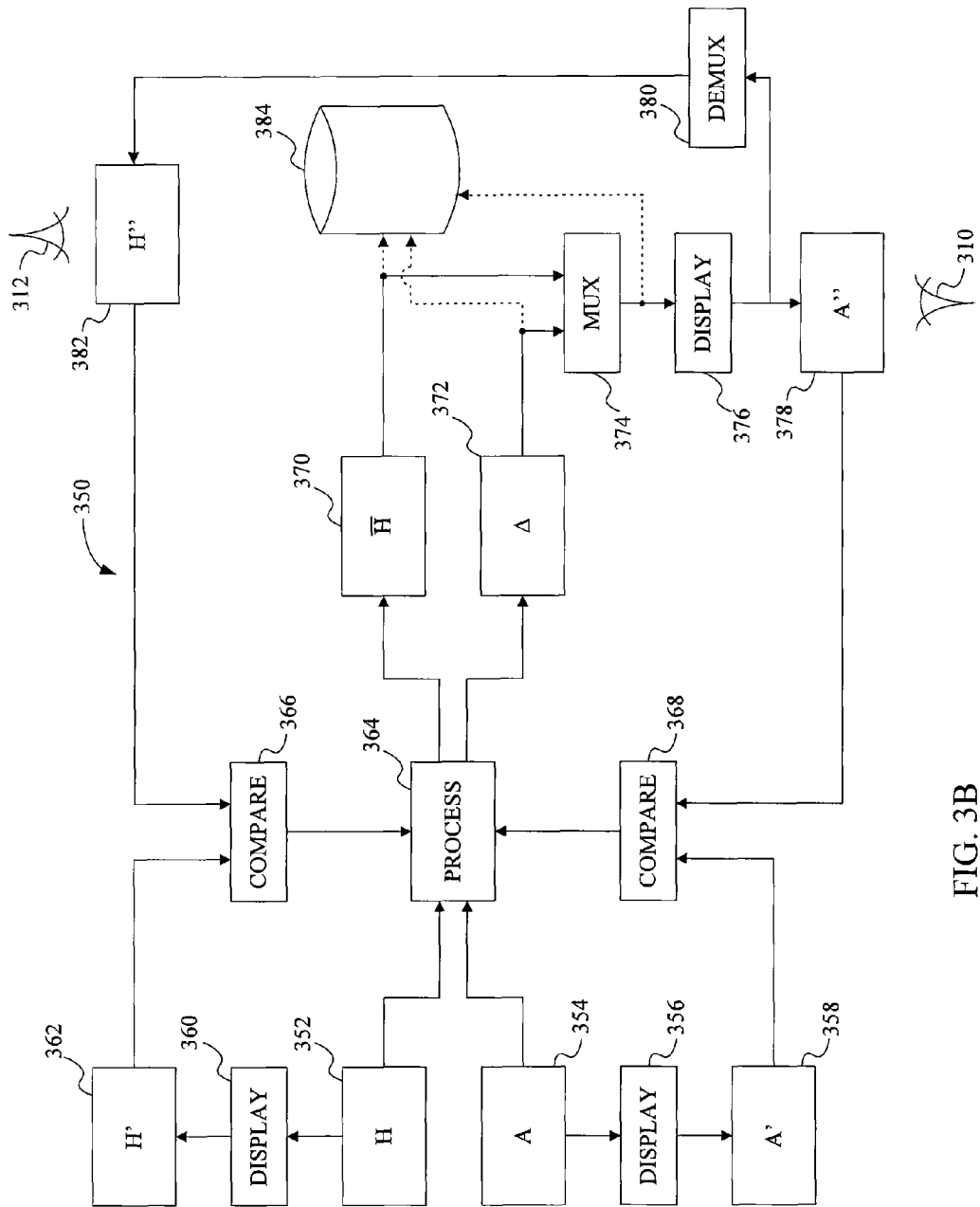
FIG. 3B is a conceptual diagram of a system for steganographic display image display, according to one embodiment of the invention.

FIG. 3B is a conceptual diagram of a system 350 for steganographic display image display, according to one embodiment of the invention. As shown, the system includes functional blocks 356, 360, 376 representing a display device, functional blocks 366, 368 representing a compare operation, functional block 374 representing a multiplexing operation, functional block 380 representing a demultiplexing operation, functional block 364 representing a processing operation, images 352, 354, 358, 362, 370, 372, 378, 382, a memory 384, and viewers 310, 312.

Images 352 and 354 represent two input images that are both target images. Image 352 may be designated as the "hidden" image and image 354 may be designated as the "ambient" image. As described herein, a delta image 372 may be computed based in part on the difference between the ambient image and the target image. When the delta image is displayed as being multiplexed with the hidden image, the resultant image is perceived as the ambient image in an ambient setting. In addition, the resultant image is perceived as the hidden image when viewed through a filter/demultiplexor 380 that blocks the delta image.

However, as described above, physical constraints and/or imperfections may be introduced into the system 350 at various points in the workflow. In some embodiments, perceived images are constrained by the limitations of the display devices. For example, the input image 354 (A), when displayed on the display device 356, may be perceived image as image 358 (A'), which is slightly different than the input image 354. Similarly, image 352 (H), when viewed via a display device 360, may be perceived image as image 362 (H'), which is slightly different than the input image 352. In one embodiment, display devices 360 and 356 are the same display device. In alternative embodiments, display devices 360 and 356 are different display devices.

In some embodiments, further limitations and/or constraints are introduced into the system 350 by the processing operation 364. For example, the processing operation 364 may perform "rounding-up" or "rounding-down" operations to various values, which may introduce artifacts. Additionally, the processing operation 364 may clamp the outputs to be within a certain displayable range of a particular display device, which may also introduce artifacts.

In still further embodiments, further limitations and/or constraints are introduced into the system 350 by the multiplexing operation 374 and/or the demultiplexing operation 380. As described, operations 374 and 380 may not be "perfect" inverses of one another when performed in the physical world.

In order to overcome these limitations and constraints, as well as other limitations that may be understood by those with ordinary skill in the art, processing block 364 may in some embodiments generate the display image 370 (H) whose spectrum will better overcome the limitations of system 350, or will provide images 378 and 382 that are perceptually closer to images 358 and 362, or which leave fewer hints of image 382 in image 378 when perceived by viewer 310. In some embodiments, the difference between image 362 and 382, and the difference between images 358 and 378, can be provided to processing block 364 from comparison blocks 366 and 368, and this information can be used in the calculation of the delta image 372 and display image 370.

As described, the functional block 364 may comprise processing operations that generate image 370 and image 372. As described in greater detail herein, images 370 and 372 may be multiplexed via a multiplexing functional block 374. In one embodiment, image 370 is identical to image 352. In another embodiment, image 370 is identical to image 362. In yet another embodiment, image 370 is not identical to either image 352 or image 362. In these embodiments, image 370 may, however, be perceived as image 352 and/or image 362. For example, the difference between image 370 and image 352 may be imperceptible to a person, or the difference may be very slight yet perceptible. The output of the multiplexor 374 is then displayed on a display device 376. When perceived by a viewer 310 that is viewing the output of the display device 376 in an ambient setting without a filter, the viewer 310 perceives image 378 (A"). When the output of the display device 376 is perceived by a viewer 312 that is viewing the output of the display device 376 through a demultiplexing filter 380, the viewer 312 perceives image 382 (H"). In one embodiment, the display device 376 is configured to implement the multiplexing functional block 374. In alternative embodiments, the display device 376 does not include the multiplexing functional block 374 and the input to the display device 376 is already multiplexed. In some embodiments, the display device 376 comprises a film projector, such as a film projector used in a cinema or home movie theater. In alternative embodiments, the display device 376 may be implemented as a media player that is configured to playback an optical disc. For example, the media player may be a Digital Versatile Disc (DVD) player, Blu-ray player, HD-DVD player, or other type of media player. In still further embodiments, the display device 376 may be implemented as a media player that is configured to playback data files. For example, the media player may comprise a software digital video media player.

As shown, images 378 and 358 are compared via the compare block 368, where the output of the compare block 368 is input into the processing functional block 364. Similarly, images 382 and 362 are compared via the compare block 366, where the output of the compare block 366 is input into the processing functional block 364. Thus, the processing functional block 364, in the embodiment shown, generate the images 370 and 372 based on four different inputs. In one embodiment, image 378 is identical to image 354. In another embodiment, image 378 is identical to image 358. In yet another embodiment, image 378 is not identical to either image 354 or image 358. In these embodiments, image 378 may, however, be perceived as image 354 and/or image 358. For example, the difference between image 378 and image 354 may be imperceptible to a person, or the difference may be very slight yet perceptible.

Adding the feedback via the compare blocks 366 and 368 allows the system 350 to compensate for calibration, drift, or errors, and/or to make adjustments that are needed to compensate for the imperfections introduced based on the limitations of the display device, the processing block 364, the multiplexor 374, and/or the demultiplexor 380. In one embodiment, the compare functional block 368 compares the images 358 and 378 and generates data representing the difference between the two images 358, 378. A similar operation is performed by the compare block 366 to generate a difference between the images 362, 382. The processing block 364 takes these differences as inputs so as to calibrate the processing operation performed by the processing functional block 364. For example, the output images that are output from the processing functional block 364, when multiplexed with one another and displayed, (and potentially demultiplexed), are perceived as the image 378 that is substantially similar to image 358. Similarly, image 382 is perceived as substantially similar to image 362. In this fashion, imperfections in the physical world can be compensated for so that the images 378 and 382 are perceived in the manner described herein.

In some embodiments, the compare block 366 and/or 368 may work in real-time, generating calibration feedback continuously as system 350 generates and/or displays various images. In other embodiments, results of compare block 366 and/or 368 may be generated in advance by analysis and measurement of the characteristics of system 350, and processing block 364 may operate using these precomputed results. In some embodiments, the use of physical display devices 356, 360 may not be required to accurately predict images 358 (A') and 362 (H'), and, thus, the compare blocks 366 and/or 368 can use predicted images rather that actual displayed images. In other embodiments, the compare blocks 366 and/or 368 operate directly using images 354 (spectrum A) and image 352 (spectrum H), respectively, and display devices 356 and/or 360 are omitted from the system 350.

In some embodiments, as shown, images 370, 372, and the output of the multiplexor 374 may be stored in a memory 384 for future display. Additionally, as should be understood by those having ordinary skill in the art, any of the images and/or inputs and/or outputs shown in FIG. 3B may also be stored in the memory 384. The memory 384 may be a server, a database, a RAM, a CD-ROM, a DVD-ROM, or any other type of technically feasible memory and/or storage unit. Additionally, images stored in memory 384 may be later reintroduced into system 350 for display to the viewers.

In some embodiments, a user identification system may be incorporated in the system 350 so that different hidden images can be perceived by different users. For example, the system 350 may be implemented in a theme park setting, where images are displayed on a wall. As described above, each person that looks at the wall without any specialized filter (i.e., in an ambient setting), perceives image 378. In contrast, persons that look through specialized filters perceive a hidden image. By incorporating the user identification system into the system 350, additional personalization and customization is possible. For example, different visitors to the theme park may be given specialized glasses, where each set of glasses includes a different radio frequency identification (RFID) tag that can be read by an RFID reader. The RFID tag may uniquely identify the individual. Accordingly, different input images 352, 354 may be provided as inputs to the system 350 based on the RFID tag included in the glasses. Thus, in one embodiment, an ambient viewer perceives image 378, while a first viewer with a first RFID tag included in filtered glasses perceives a first hidden image and a second viewer with a second RFID tag included in filtered glasses perceives a second hidden image. In another embodiment, an identified person may perceive a message directed to them individually, including, but not limited to personalized messages (e.g., "Hi, John Doe!"), character or personality tie ins, scripted walkthroughs, or other events. In another embodiment, the RFID tag does not uniquely identify the individual, but instead categorizes the individual into one of two or more groups of individuals. Different hidden images may be perceived by members of each of the two or more groups of individuals. As persons having ordinary skill in the art would understand, the user identification system described herein is not limited to RFID identification, and may include any technique for user identification including cell phone identification, credit card identification, or any other technically feasible technique for identifying a user or a group of users.

In one embodiment, to implement the user identification system, an identity identification system (e.g., RFID reader) determines that the identity of an individual corresponds to a first hidden image. Based on the identity, a first pair of images 352, 354 is selected and used as input into the system 350, where image 352 is a first hidden image and image 354 is an ambient image. The result of processing the images 352, 354 in the first pair via process block 364 is a pair of images 370, 372 that is multiplexed, where image 370 is a first display image and image 372 is a first delta image. If, however, the identity identification system determines that identity of an individual corresponds to a second hidden image, then a second pair of images 352, 354 is selected and used as input into the system 350. Image 352 in the second pair of image corresponds to a second image and image 354 in the second pair corresponds to the ambient image. In one embodiment, the ambient image in the first pair is the same as the ambient image in the second pair. The result of processing the images 352, 354 in the second pair via process block 364 is a pair of images 370, 372 that is multiplexed, where image 370 is a second display image and image 372 is a second delta image. The pair of images 370, 372 that is output from the processing block is different when using the second pair of images as input when compared to using the first pair of images as input. Accordingly, an ambient observer would perceive image 378 irrespective of which pair of images is used as input to the system 350. A person that views the first multiplexed result using a filter that blocks the first delta image perceives the first hidden image; whereas, a person that views the second multiplexed result using a filter that blocks the second delta image perceives the second hidden image.

Figure 4A:
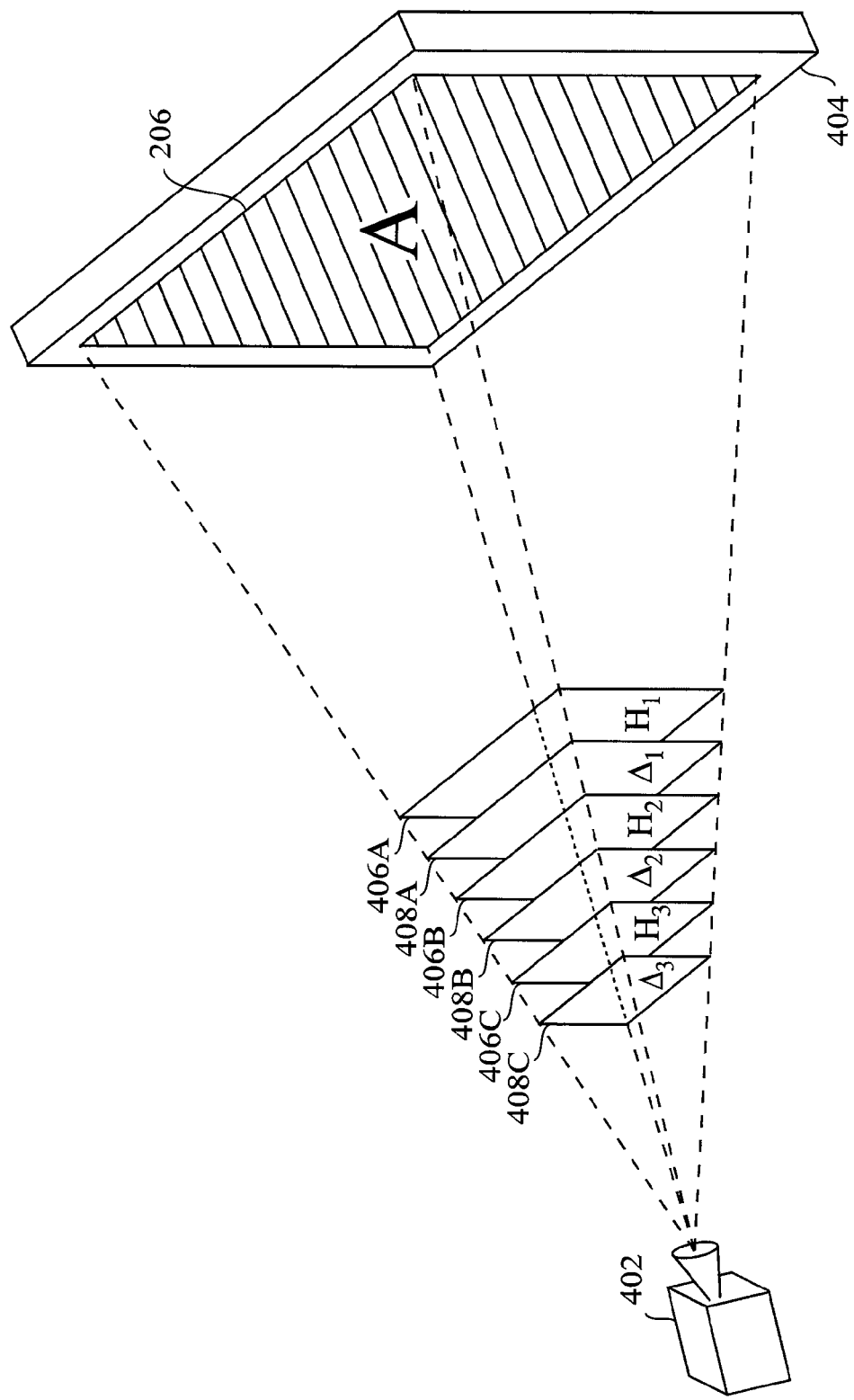
FIG. 4A is a conceptual diagram illustrating a system where time division multiplexing is used to display the display image, according to one embodiment of the invention.

FIG. 4A is a conceptual diagram illustrating a system 400 where time division multiplexing is used to display the display image 206, according to one embodiment of the invention. As shown, the system 400 includes a projector 402 and a screen 404. The projector 402 projects images onto the screen 404. The images projected by the projector 402 alternate between being images H and images Δ. In one embodiment images 406A, 406B, and 406C are each repeated displays of image H. Similarly, images 408A, 408B, and 408C are each repeated displays of image Δ. In some embodiments, images 406A, 406B and 406C are consecutive frames of an animation or movie, while similarly, images 408A, 408B and 406C are consecutive frames of an animation or movie. As described above, when spectrum H at various image locations in the displayed image is combined with the corresponding spectrum Δ, the result is spectrum A. This combination results in the display image 206 that is displayed on the screen 404. As also described above, an ambient viewer, who is not viewing the screen 404 through any type of filter, perceives the display image 206. A viewer that views the screen 404 through a filter that blocks spectrum Δ sees an image derived from one or more of images 406A, 406B, 406C (including spectrum H). Again, as described above, both image 206 (including spectrum A) and the image derived from one or more of images 406A, 406B, 406C (including spectrum H) are target images that are intended to be perceived.

Figure 4B:
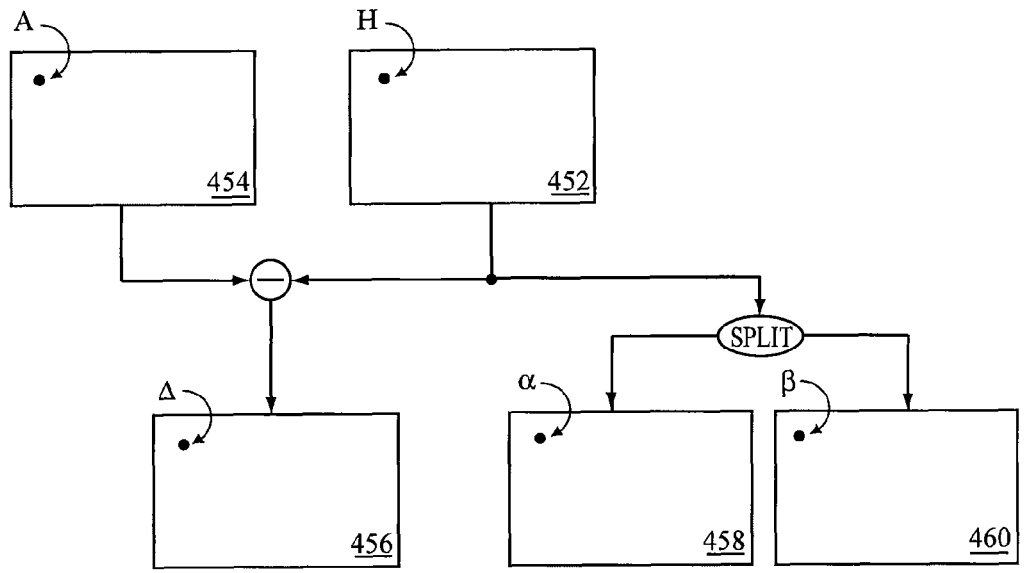
FIG. 4B is a conceptual diagram illustrating three images configured for steganographic image display and creation of a fourth image, according to one embodiment of the invention.

FIG. 4B is a conceptual diagram illustrating three images 458, 460, 456 configured for steganographic display and creation of a fourth image 454, according to one embodiment of the invention. As described above in FIG. 2, the image 454 (ambient image) and the image 452 (hidden image) may be input images. By calculating the difference, at each image location, between image 454 and image 452, image 456 is determined (delta image), as illustrated in equation 462. Some embodiments of the invention display the hidden image 452, which is meant to be seen by some viewers, and the non-target delta image 456, which is not meant to be seen. However, some techniques for image display technology used for displaying images 452 and/or 456 may have certain intrinsic flaws that make it possible for ambient viewers to momentarily see all or part of the hidden image 452. For example, the human physical behavior of saccading can cause the ambient viewer to momentarily perceive a single image that is presented in a time-division multiplexing display. Saccading makes it possible for an ambient viewer to unintentionally perceive the hidden image 452, even without the use of time-division filters.

To prevent this accidental exposure of the hidden image 452, an embodiment of the invention can divide the hidden image 452 into two images: an alpha image 458 and a beta image 460, as shown in FIG. 4B and illustrated in equation 464. In some embodiments, both the alpha image 458 and the beta image 460 are non-target images, and individually are not recognizable or perceivable images. For any given image location, when the spectrum of the alpha image 458 is combined with the spectrum of the beta image 460, the result is the hidden image 452.

Similarly, as described above, the delta image 456 may be computed that is the difference between the hidden image 452 and the ambient image 454. Accordingly, in this embodiment, the display system is configured to display all three of the alpha image 458, the beta image 460, and the delta image 456. As shown, a viewer that views the display image without a filter views the combination of alpha image 458, beta image 460 and delta image 456, and thereby perceives the target ambient image 452, as illustrated in equation 466. A viewer that views the displayed image 454 using a filter that blocks the delta image 456, views the combination of the alpha image 458 and the beta image 460, and, thus, perceives the target hidden image 452, as illustrated in equation 468. When a viewer that does not use a filter perceives all or part of the alpha image 458 and/or the beta image 460 individually, the viewer does not perceive the hidden image 452, and the existence and content of the hidden image 452 remains unexposed to the viewer.

Figure 5:
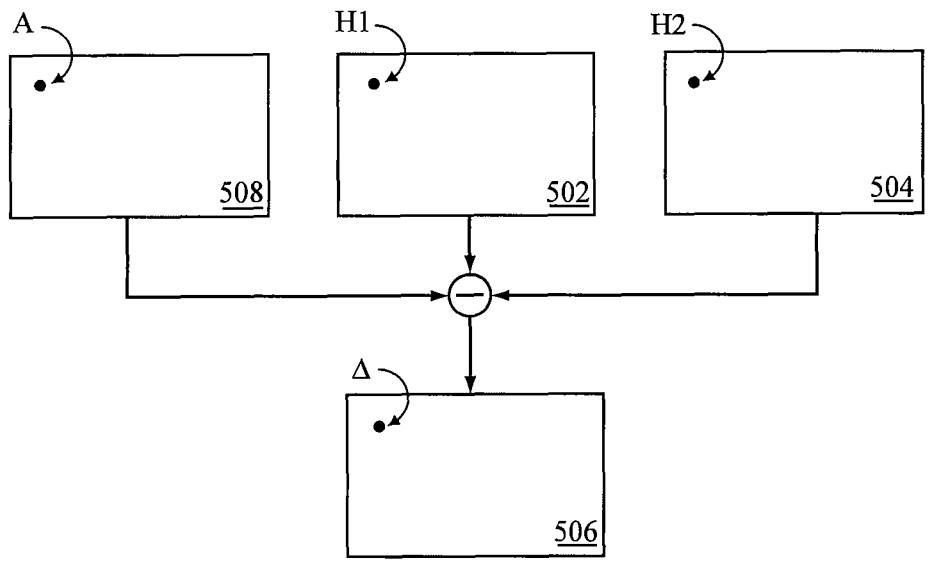
FIG. 5 is a conceptual diagram illustrating three images configured for steganographic image display of a fourth image, according to one embodiment of the invention.

FIG. 5 is a conceptual diagram illustrating three images 502, 504, 506 configured for steganographic image display of a fourth image 508, according to one embodiment of the invention. As shown, images 502, 504, and 506 may be combined together to achieve image 508. Image 502, also referred to herein as a first hidden image, includes image locations containing spectrum H1, image 504, also referred to herein as a second hidden image, includes image locations containing spectrum H2, and image 506 includes image locations containing spectrum Δ. As shown in equation 510, when spectrum H2 is combined with spectrum H1 and spectrum Δ, the result is spectrum A. A viewer that views the display image without a filter would perceive image 508, also referred to herein as an "ambient image," which is associated with spectrum A.

As shown in equation 512, excluding spectrum H2 and spectrum Δ from spectrum (H1+H2+Δ) results in spectrum H1. In one embodiment, spectrum (H1+H2+Δ) is equivalent to spectrum A. A viewer that views the display image through a filter that blocks both spectrum H2 and spectrum Δ perceives hidden image 502, which is associated with spectrum H1.

Similarly, as shown in equation 514, excluding spectrum H1 and spectrum Δ from spectrum (H1+H2+Δ) results in spectrum H2. A viewer that views the display image through a filter that blocks both spectrum H1 and spectrum Δ perceives hidden image 504, which is associated with spectrum H2.

Each of images 502, 504, and 508 are target images that are intended to be perceived. Image 506, on the other hand, is a non-target image that is not intended to be perceived. As described herein, three different viewers can see three completely different images by viewing the same display image, where one viewer is viewing the display image without a filter and each of the other two viewers is using a different filter.

Figure 6:
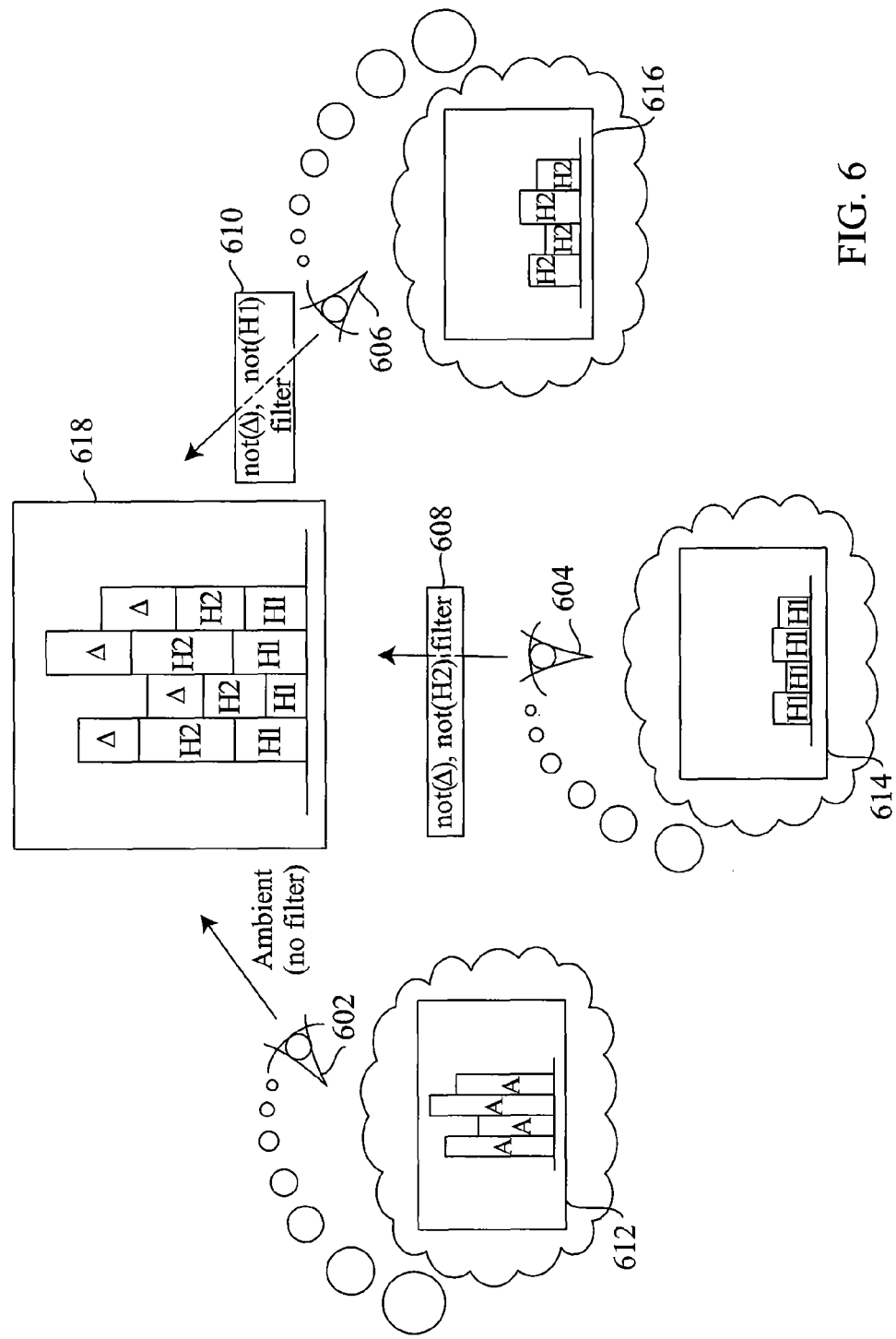
FIG. 6 is a conceptual diagram of a display image viewed by three viewers, according to one embodiment of the invention.

FIG. 6 is a conceptual diagram of a display image 618 viewed by three viewers 602, 604, 606, according to one embodiment of the invention. As shown, viewer 602 is viewing the display image 618 with no filter, viewer 604 is viewing the display image 618 through filter 608, and viewer 606 is viewing the display image 618 through filter 610. Filter 608 is a "not(Δ), not(H2) filter" that does not pass spectra Δ nor H2, resulting in only spectrum H1 passing through. Filter 610 is a "not(Δ), not(H1) filter" that does not pass spectra Δ nor H1, passing only spectrum H2.

The display image 618 is composed of three separate images whose image locations include spectra H1, H2, and Δ, respectively. The viewer 602 perceives view 612 that includes the combination of spectra H1, H2, and Δ, which results in spectrum A. The viewer 604 perceives view 614 that includes only spectrum H1. The viewer 606 perceives view 616 that includes only spectrum H2. Again, each viewer 602, 604, 606 perceives a different view 612, 614, 616, respectively, when looking at the display image 618. As persons having ordinary skill in the art would understand, any number of different images can be combined with one another and with a "Δ image" to achieve a display image, where four or more different viewers can perceive the display image differently and where each of the four or more images is a target image.

Figure 7:
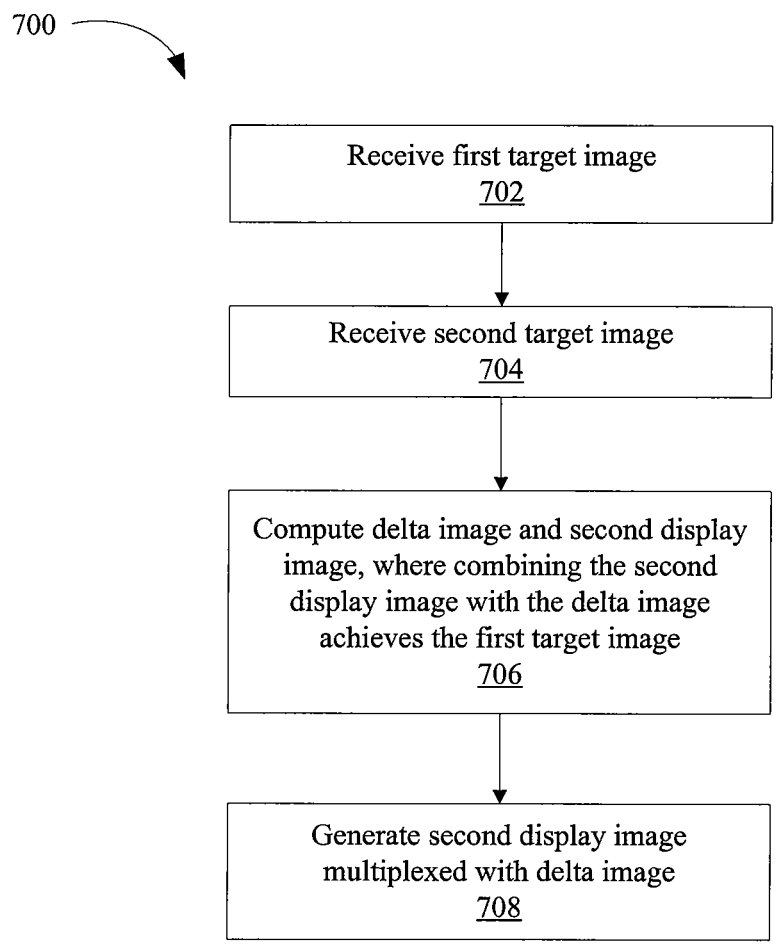
FIG. 7 is a flow diagram of method steps for generating a target image that includes a sub-image that is also a target image, according to one embodiment of the invention.

FIG. 7 is a flow diagram of method steps for generating a display image, according to one embodiment of the invention. Persons skilled in the art will understand that, even though the method 700 is described in conjunction with the systems of FIGS. 1-6, any system configured to perform the method steps, in any order, is within the scope of embodiments of the invention.

As shown, the method 700 begins at step 702, where a software application receives a first target image. The software application may be stored in the system memory 104 and executed by the CPU 102 and/or the display processor 112. In one embodiment, the software application is a rendering application executed by the CPU 102.

In some embodiments, the first target image is an image that is intended to be perceived by a viewer. In one embodiment, the first target image is a single still image. In alternative embodiments, the first target image is frame of a video or animation sequence.

At step 704, the software application receives a second target image. In some embodiments, the second target image is also an image that is intended to be perceived by a viewer. In one embodiment, the second target image is a single still image. In alternative embodiments, the second target image is frame of a video or animation sequence. In some embodiments, the second target image is completely different from the first target image. In other embodiments, the second target image is similar to the first target image. For example, the second target image may represent a subset of the objects that are represented by the first target image, or vice versa.

At step 706, the software application computes a delta image and a second display image, where multiplexing the second display image with the delta image achieves the first target image. As described herein, various techniques may be used to perform the multiplexing operation involving the second display image and the delta image. For example, the multiplexing operator may be, without limitation, a chromatic multiplexing operator, a temporal multiplexing operator, a spatial multiplexing operator, a multiplexing summing operator, a polarization multiplexing operator, or any other technically feasible multiplexing operator. The implementation of step 706 may be different depending on what type of multiplexing operator is used to multiplex the second display image with the delta image.

At step 708, the software application displays and/or stores data that represents the second display image multiplexed with the delta image. The data generated may be stored in a memory or displayed by a display device. Again, the implementation of step 708 may be different depending on what type of multiplexing operator is used to multiplex the second display image with the delta image. In one embodiment, when the data that is generated is displayed on a display device, a viewer that is not using a filter perceives the first target image (e.g., in an ambient setting). A viewer that is viewing the generated data through a filter that blocks the delta image perceives the second target image.

Figure 8:
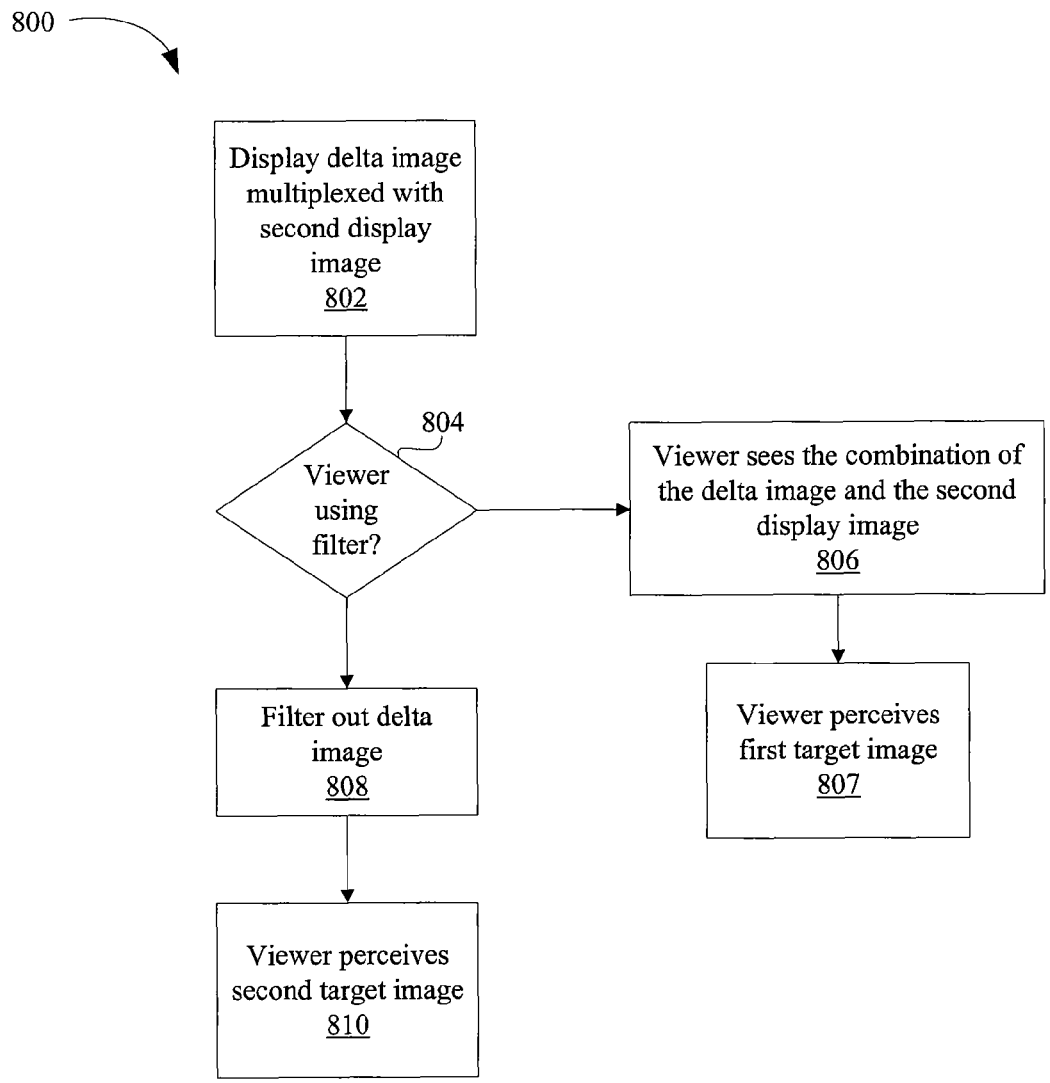
FIG. 8 is a flow diagram illustrating how using a filter causes a viewer to perceive the target image differently, according to one embodiment of the invention.

FIG. 8 is a flow diagram illustrating how using a filter causes a viewer to perceive the target image differently, according to one embodiment of the invention. Persons skilled in the art will understand that, even though the method 800 is described in conjunction with the systems of FIGS. 1-6, any system configured to perform the method steps, in any order, is within the scope of embodiments of the invention.

As shown, the method 800 begins at step 802, where a software application causes a delta image multiplexed with a second display image to be displayed. In one embodiment, the image(s) that are displayed at step 804 are generated at step 708, described in FIG. 7.

Referring back to FIG. 8, at step 804, if the viewer is looking at the display image without a filter, then the method 800 proceeds to step 806, where the viewer sees the combination of the delta image and the second target image, and then immediately proceeds to step 807, where the viewer perceives the first target image If, at step 804, the viewer is looking at the display image through a filter, then the method 800 proceeds to step 808. At step 808, the delta image is filtered out from the display image by the filter. Thus, at step 810, the viewer perceives the second target image.

Again, as described herein, both the first target image and the second target image are images that are intended to be perceived. In some embodiments, since the delta image provides the difference between the first target image and the second target image, the delta image is likely to be a seemingly noisy and/or undesirable image that is not intended to be viewed.

Additionally, embodiments of the invention are not limited to two or three different target images that can be displayed simultaneously. Embodiments of the invention apply equally well to any number of different "target" images that can be combined with a delta image to generate another target image.

Advantageously, embodiments of the invention provide a technique to obscure an image from an ambient observer, while still providing the ambient observer with a target image that is meant to be perceived. Thus, the ambient observer would not be able to detect that an image is being hidden within the display image, or obscured by the display image that the ambient observer perceives.

Various embodiments of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments and numerous specific details are set forth to provide a more thorough understanding of the invention. Persons skilled in the art, however, will understand that various modifications and changes may be made thereto without departing from the broader spirit and scope of the invention. The foregoing description and drawings are, accordingly, to be regarded in an illustrative rather than a restrictive sense.

What is claimed is:

1. A computer-implemented method for generating images, the method comprising:
   receiving a first target image comprising a first human-perceptible image;
   receiving a second target image, dissimilar from the first target image, comprising a second human-perceptible image;
   subtracting the second target image from the first target image, at each image location, to generate a first display image;
   generating a second display image that is perceivable as the second target image;
   splitting the second display image into a third display image and a fourth display image, wherein neither the third display image nor the fourth display image is recognizable as the second target image, and
   multiplexing the first display image with the third display image and the fourth display image to generate a fifth display image that is perceivable as the first target image when viewed in an ambient setting;
   wherein the fifth display image, when viewed via a visual aid, is perceivable as the second target image.

2. The method of claim 1, wherein the second display image is similar to the second target image.

3. The method of claim 1, wherein the second display image corresponds to the second target image but is not similar to the second target image.

4. The method of claim 1, further comprising displaying the first display image multiplexed with the second display image on a display device, or storing the first display image multiplexed with the second display image in a memory.

5. The method of claim 4, wherein displaying comprises projecting the first display image and the second display image in an alternating pattern.

6. The method of claim 5, wherein the first display image multiplexed with the second display image, when viewed by the person though a shutter that blocks one display image each time that image is projected, is perceived as the second target image to the person.

7. The method of claim 4, wherein the first display image multiplexed with the second display image, when viewed by the person though a filter that blocks one display image, is perceived as the second target image.

8. The method of claim 1, wherein multiplexing the first display image with the second display image comprises performing time division multiplexing.

9. The method of claim 1, wherein multiplexing the first display image with the second display image comprises performing wavelength division multiplexing, phase division multiplexing, polarization multiplexing, and/or chromatic multiplexing.

10. The method of claim 1, wherein computing the first display image and the second display image is further based in part on a difference between a first compare image that is perceived when the first display image multiplexed with the second display image is displayed on a first display device and a second compare image that is perceived when the first target image is displayed on a second display device.

11. The method of claim 1, wherein computing the first display image and the second display image is further based in part on a difference between a first compare image that is perceived when the first display image multiplexed with the second display image is viewed by the person though a filter that blocks one display image and a second compare image that is perceived when the second target image is displayed on a second display device.

12. The method of claim 1, wherein the first target image represents a scene that is a subset of a scene represented by the second target image.

13. The method of claim 1, wherein the second target image represents a scene that is a subset of a scene represented by the first target image.

14. The method of claim 1, wherein the first target image is visually unrelated to the second target image.

15. A computer-readable storage medium storing instructions that, when executed by a processor, cause a computer system to generate images, by performing the steps of:
   receiving a first target image comprising a first human-perceptible image;
   receiving a second target image, dissimilar from the first target image, comprising a second human-perceptible image;
   subtracting the second target image from the first target image, at each image location, to generate a first display image;
   generating a second display image that is perceivable as the second target image;
   splitting the second display image into a third display image and a fourth display image, wherein neither the third display image nor the fourth display image is recognizable as the second target image, and
   multiplexing the first display image with the fourth display image and the fifth display image to generate a fifth display image that is perceivable as the first target image when viewed in an ambient setting;

wherein the fifth display image, when viewed via the visual aid, is perceivable as the second target image.

16. The computer-readable storage medium of claim 15, wherein the second display image is similar to the second target image.

17. The computer-readable storage medium of claim 15, wherein the second display image corresponds to the second target image but is not similar to the second target image.

18. The computer-readable storage medium of claim 15, wherein the first display image multiplexed with the second display image, when viewed by the person though a filter that blocks one display image, is perceived as the second target image.

19. The computer-readable storage medium of claim 15, wherein multiplexing the first display image with the second display image comprises performing time division multiplexing, wavelength division multiplexing, phase division multiplexing, polarization multiplexing, and/or chromatic multiplexing.

20. The computer-readable storage medium of claim 15, wherein computing the first display image and the second display image is further based in part on a difference between a first compare image that is perceived when the first display image multiplexed with the second display image is displayed on a first display device and a second compare image that is perceived when the first target image is displayed on a second display device.

21. The computer-readable storage medium of claim 15, wherein computing the first display image and the second display image is further based in part on a difference between a first compare image that is perceived when the first display image multiplexed with the second display image is viewed by the person though a filter that blocks one display image and a second compare image that is perceived when the second target image is displayed on a second display device.

22. A system, comprising:
a device configured to:
cause a first display image, that is perceivable as a first human-perceptible target image when viewed in an ambient setting, to be displayed,
wherein the first display image is generated by multiplexing a second display image with a third display image and a fourth display image,
wherein the third display image and the fourth display image are generated by splitting a fifth display image into the third display image and the fourth display image;
wherein the fifth display image is generated by subtracting a second human-perceptible target image, dissimilar from the first human-perceptible target image, from the first human-perceptible target image, at each image location,
wherein the second display image is perceivable as the second human-perceptible target image,
wherein the first display image, when viewed via a visual aid, is perceivable as the second human-perceptible target image.

23. The system of claim 22, wherein the fifth display image is similar to the second target image.

24. The system of claim 22, wherein the fifth display image corresponds to the second target image but is not similar to the second target image.

25. The system of claim 22, wherein the device is further configured to multiplex the second display image with the fifth display image.

26. The system of claim 22, further comprising a multiplexing device configured to multiplex the second display image with the fifth display image.

27. The system of claim 22, wherein the second display image multiplexed with the fifth display image, when viewed by the person though a filter that blocks one display image, is perceived as the second target image.

28. The system of claim 22, wherein the second display image is multiplexed with the third display image and the fourth display image using time division multiplexing, wavelength division multiplexing, phase division multiplexing, polarization multiplexing, and/or chromatic multiplexing.

29. The system of claim 22, wherein the device comprises a film projector.

30. The system of claim 22, wherein the device comprises a media player configured to playback an optical disc or digital data on a display device.

31. The system of claim 30, wherein the display device comprises a television or computer display or digital projector.

32. A computer-implemented method for generating images, the method comprising:
receiving a first target image comprising a first human-perceptible image;
receiving a second target image, dissimilar from the first target image, comprising a second human-perceptible image;
receiving a third target image, dissimilar from the first target image, comprising a third human-perceptible image;
subtracting the second target image and the third target image from the first target image, at each image location, to generate a first display image;
generating a second display image that is perceivable as the second target image;
generating a third display image that is perceivable as the third target image;
splitting the third display image into a fourth display image and a fifth display image, wherein neither the fourth display image nor the fifth display image is recognizable as the third target image; and
multiplexing the first display image with the second display image, the fourth display image, and the fifth display image to generate a sixth display image that is perceivable as the first target image when viewed in an ambient setting;
wherein the sixth display image, when viewed via a first visual aid, is perceivable as the second target image,
wherein the sixth display image, when viewed via a second visual aid, is perceivable as the third target image.

33. The method of claim 32, wherein the second display image is similar to the second target image, and wherein the third display image is similar to the third target image.

34. The method of claim 32, wherein the second display image corresponds to the second target image but is not similar to the second target image, or the third display image corresponds to the third target image but is not similar to the third target image.

35. The method of claim 32, further comprising displaying the first display image multiplexed with the second display image, the fourth display image, and the fifth display image on a display device, or storing the first display image multiplexed with the second display image and the third display image in a memory.

36. The method of claim 32, wherein the first display image multiplexed with the second display image, the fourth display image, and the fifth display image, when viewed by the person though a filter that blocks the first display image and the third display image, is perceived as the second target image.

37. A computer-implemented method for generating images, the method comprising:
- receiving a first target image comprising a first human-perceptible image;
- receiving a second target image, dissimilar from the first target image, comprising a second human-perceptible image;
- subtracting the second target image from the first target image, at each image location, to generate a first display image;
- generating a second display image that is perceivable as the second target image; and
- multiplexing the first display image with the second display image to generate a third display image that is perceivable as the first target image when viewed in an ambient setting;
- wherein the third display image, when viewed via a visual aid, is perceivable as the second target image,
- wherein computing the first display image and the second display image is further based in part on a difference between a first compare image that is perceived when the first display image multiplexed with the second display image is displayed on a first display device and a second compare image that is perceived when the first target image is displayed on a second display device.

* * * * *